(12) United States Patent
Lungershausen

(10) Patent No.: US 8,052,915 B2
(45) Date of Patent: Nov. 8, 2011

(54) APPARATUS FOR FORMING AN EXTRUSION BLOW MOLDED VESSEL WITH INSERT AND METHOD

(75) Inventor: Dirk Lungershausen, Wiesbaden (DE)

(73) Assignee: GM Global Technology Operations LLC, Detroit, MI (US)

( * ) Notice: Subject to any disclaimer, the term of this patent is extended or adjusted under 35 U.S.C. 154(b) by 1036 days.

(21) Appl. No.: 11/595,314

(22) Filed: Nov. 10, 2006

(65) Prior Publication Data
US 2008/0113132 A1   May 15, 2008

(51) Int. Cl.
*B29C 49/04* (2006.01)
*B29C 49/20* (2006.01)

(52) U.S. Cl. ........ 264/516; 264/514; 264/533; 264/540; 264/259

(58) Field of Classification Search .......................... None
See application file for complete search history.

(56) References Cited

U.S. PATENT DOCUMENTS

| | | | |
|---|---|---|---|
| 4,261,473 A * | 4/1981 | Yamada et al. ............... | 215/379 |
| 4,414,175 A * | 11/1983 | Rainville ..................... | 264/531 |
| 4,617,077 A * | 10/1986 | Giese et al. .................... | 156/245 |
| 5,253,778 A | 10/1993 | Sirosh | |
| 5,429,845 A | 7/1995 | Newhouse et al. | |
| 5,538,680 A * | 7/1996 | Enders ......................... | 264/516 |
| 6,946,176 B2 | 9/2005 | Jousse et al. | |

FOREIGN PATENT DOCUMENTS

| | | |
|---|---|---|
| DE | 2 112 835 | 9/1972 |
| DE | 103 47 924 A1 | 5/2005 |
| EP | 1 234 654 A1 | 8/2002 |
| EP | 2 030 769 A1 | 3/2009 |

OTHER PUBLICATIONS

Lee, Norman. Practical Guide to Blow Moulding. Shrewsbury: Rapra Technology Limited. 2006. pp. 2, 47-48, 70.*

* cited by examiner

*Primary Examiner* — Monica A Huson
(74) *Attorney, Agent, or Firm* — Fraser Clemens Martin & Miller LLC; J. Douglas Miller

(57) ABSTRACT

An apparatus and method of forming a vessel is disclosed, wherein a plurality of bosses are disposed in a pattern die having a die cavity with a desired shape, a material is extruded through the mold, the material is blow molded to take the shape of the cavity, and the bosses are adhered to the material.

17 Claims, 4 Drawing Sheets

US 8,052,915 B2

APPARATUS FOR FORMING AN EXTRUSION BLOW MOLDED VESSEL WITH INSERT AND METHOD

FIELD OF THE INVENTION

The invention relates to a hollow vessel and more particularly to a method and apparatus for forming a blow molded vessel having a plurality of bosses and adapted to receive a fluid, wherein the plurality of bosses is disposed in a pattern die having a die cavity with a desired shape, a material is extruded through the bosses and into the cavity, the material is blow molded to take the shape of the cavity to form the vessel, and the bosses are fixed to the vessel.

BACKGROUND OF THE INVENTION

Fuel cells have been proposed as a power source for electric vehicles and other applications. In proton exchange membrane (PEM) type fuel cells, hydrogen is supplied to an anode of the fuel cell and oxygen is supplied as an oxidant to a cathode. A plurality of fuel cells are stacked together in fuel cell stacks to form a fuel cell system. Typically, numerous fuel cells are required to power fuel cell powered vehicles. Large amounts of hydrogen stored in a tank on the vehicle are supplied to each of the fuel cell stacks to power the fuel cell stacks. The fuel and oxidant are typically stored in large pressurized fuel tanks disposed on an undercarriage of the vehicle.

Typically, fuel tanks are cylindrical in shape, and are disposed transversely on the undercarriage of the vehicle, behind the rear passenger seats and between the rear wheels. Current fuel tanks are manufactured using a rotational molding method. A tank is formed utilizing the rotational molding method by: disposing bosses in a die cavity with a polymer resin, heating the mold while it is rotated causing the resin to melt and coat walls of the die cavity, cooling the die, and removing the molded tank. The rotational molding method may be used to produce nearly any hollow, one layer part including an inserted, integrated boss. However, the rotational molding method has a long cycle time, typically completing only one to two cycles an hour. Accordingly, the rotational molding method is better utilized for the creation of only a small number of tanks. Further, because the rotational molding method may only be used with a single polymer level, the rotational molding method does not permit the formation of multilayered tanks. A multilayered polymer tank is desired because the hydrogen permeability of a single layer tank may be one thousand times more permeable than some multilayered blow molded tanks.

It would be desirable to develop a method and apparatus for forming a blow molded vessel having a plurality of bosses and adapted to store a fluid, wherein a plurality of bosses are disposed in a mold and a material is extruded into the mold and blow molded, the material adhering to the bosses and taking the desired shape of the mold.

SUMMARY OF THE INVENTION

Concordant and congruous with the present invention, a blow molded vessel having a plurality of bosses and adapted to store a fluid, wherein a plurality of bosses are disposed in a mold and a material is extruded through the mold and blow molded adhering the material to the bosses and taking the desired shape of the mold, has surprisingly been discovered.

In one embodiment, an apparatus for blow molding a container comprises a pattern die having a first finish forming die cavity and a die cavity formed therein; a mandrel disposed in said pattern die, wherein said mandrel is adapted to form a parison formed from a moldable material and said mandrel is adapted to position the parison in said pattern die during a blow molding process; and a boss disposed in the first finish forming die cavity of said pattern die, wherein during the blow molding process the parison is expanded by a first fluid to take the form of the die cavity and adhere to said boss to form a container, a substantially fluid tight seal formed between said boss and the expanded parison.

In another embodiment, a blow molded vessel comprises a container formed from a moldable material, wherein said container forms a cavity adapted to store a fluid; an outer layer disposed about said container; at least a boss caused to adhere to the moldable material of said inner layer and to form a substantially fluid tight seal and adapted to provide fluid communication with the cavity; and a finish forming die cavity formed in said inner layer and adapted to receive said boss.

The invention also provides a method of forming a fluid vessel comprising the steps of providing a pattern die having a first finish forming cavity and a die cavity formed therein; providing a mandrel disposed in the pattern die and adapted to receive a parison formed from a moldable material; providing a boss, wherein the boss is disposed in the first finish forming cavity; positioning the mandrel and parison in the cavity; causing a fluid to flow through the parison and pattern die to expand the parison to form a container having the shape of the die cavity of the pattern die; removing the container from the pattern die; and providing an outer layer on an outer surface of the container.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
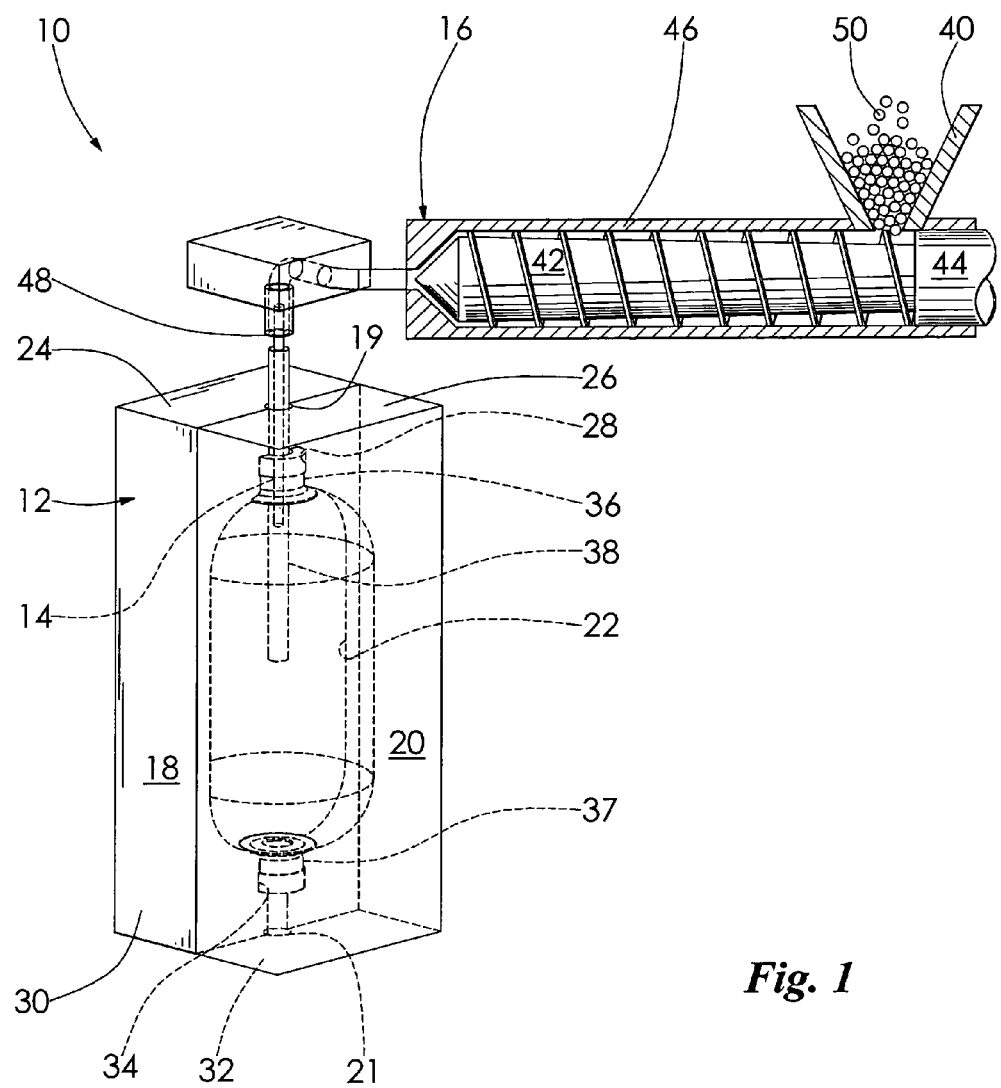
FIG. 1 is a perspective view of an extruder and blow molding apparatus showing a portion in section according to an embodiment of the invention.

FIG. 1 illustrates a blow molding apparatus 10 having a pattern die 12, a mandrel 14, and in communication with an extruder 16. The blow molding apparatus 10 has a substantially rectangular shape, however it is understood that the blow molding apparatus 10 may have any shape as desired. It is also understood that the blow molding apparatus 10 may be formed from any conventional material or combination of materials such as steel, a steel alloy, aluminum, a plastic, a concrete, a wood, or titanium, for example.

Figure 3:
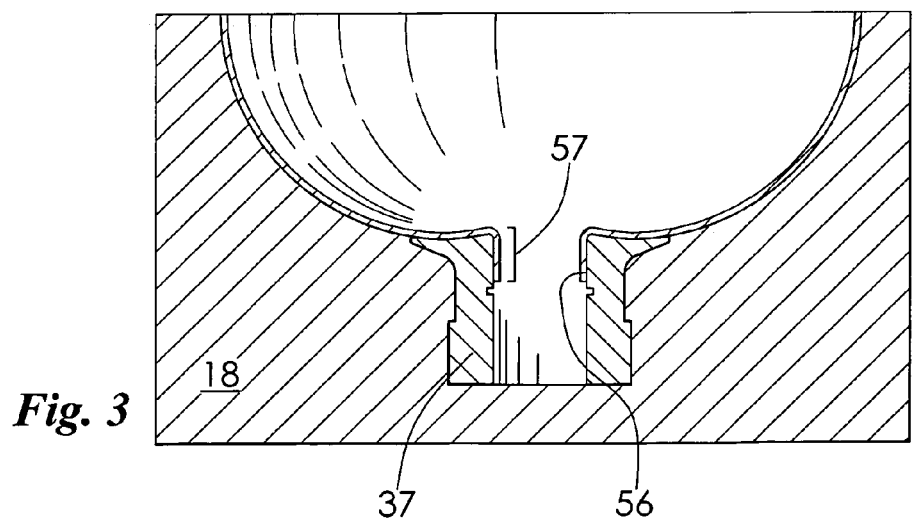
FIG. 3 is a cross-sectional view of the blow molded container in a pattern die of the apparatus shown in FIG. 2.
Figure 4:
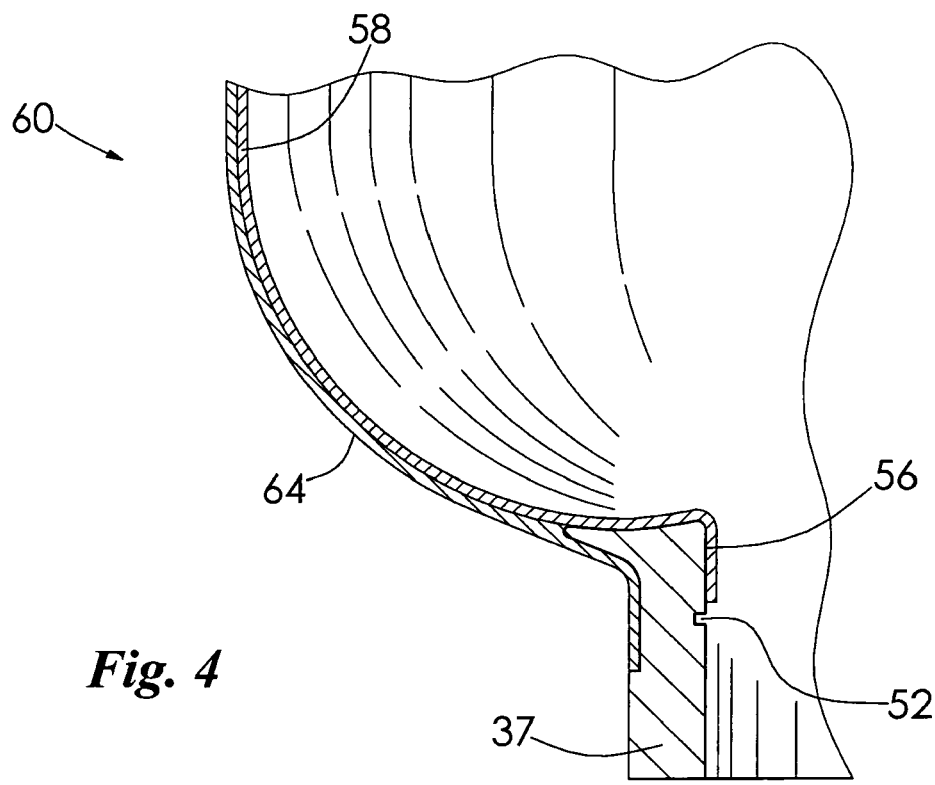
FIG. 4 is a fragmentary sectional view of the single layer blow molded container shown in FIG. 2 including an outer layer formed thereon.
Figure 5:
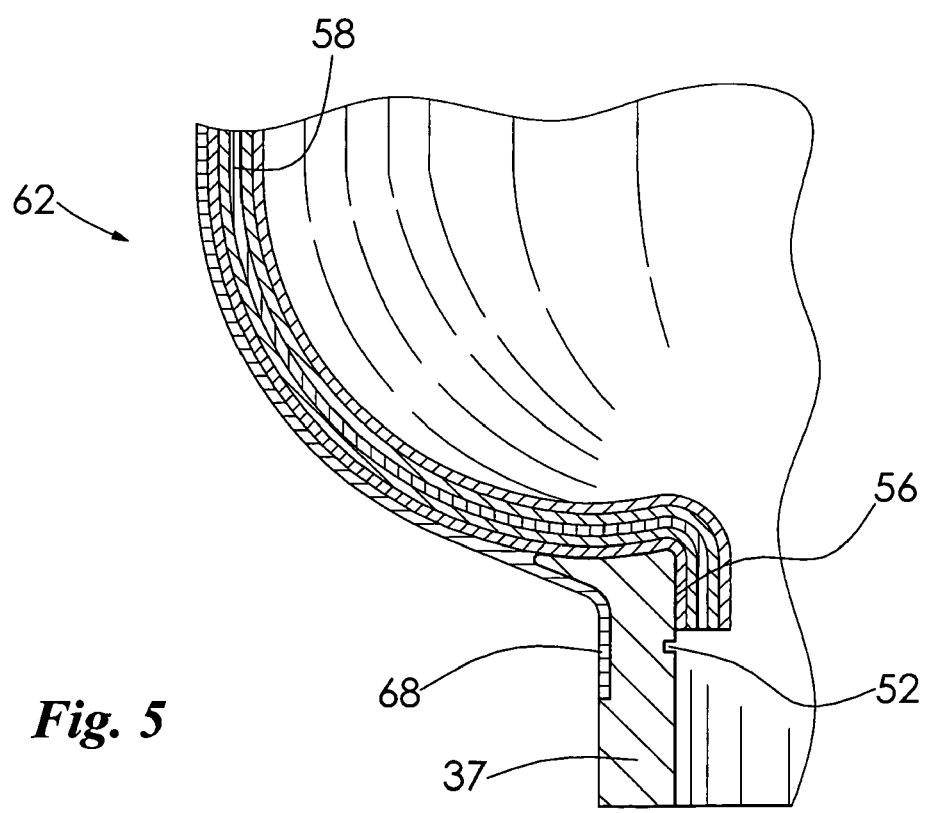
FIG. 5 is a fragmentary sectional view of a multilayered blow molded container according to another embodiment of the invention.

The pattern die 12 includes a first die half 18, a second die half 20, a first aperture 19, and a second aperture 21. The first die half 18 and the second die half 20 cooperate to form a die cavity 22. In the embodiment shown in FIG. 1, the die cavity 22 has a substantially cylindrical shape with a circular cross-sectional shape. It is understood that the die cavity 22 may form any shape such as rectangular and ovoid, as desired. A first end 24 of the first die half 18 and a first end 26 of the second die half 20 cooperate to form a first finish forming die cavity 28. The first finish forming die cavity 28 is in communication with the die cavity 22 and is adapted to receive a first boss 36 therein. A second end 30 of the first die half 18 and a second end 32 of the second die half 20 cooperate to form a second finish forming die cavity 34. The second finish forming die cavity 34 is in communication with the die cavity 22 and is adapted to receive a second boss 37. It is understood that the first die half 18 and the second die half 20 of the blow molding apparatus 10 may form a single finish forming cavity or a plurality of finish forming cavities, as desired. The bosses 36, 37 are separately produced finishes that form the opening of a container and are shaped to accommodate a specific closure. As shown in FIGS. 3, 4, and 5, the bosses 36, 37 include a groove 52 adapted to receive a portion of a hose, nozzle, conduit, or other means for fluid communication with the bosses 36, 37, and the die cavity 22. It is also understood that the boss 36 may be any finish formed from any conventional material such as a plastic, steel, a steel alloy, or aluminum, for example. The first aperture 19 is formed by the first die half 18 and the second die half 20 at the respective first ends 24, 26 thereof. The second aperture 21 is formed by the first die half 18 and the second die half 20 at the respective second ends 30, 32 thereof. The first aperture 19 provides communication between the extruder 16 and the die cavity 22 of the blow molding apparatus 10, and between the mandrel 14 and the die cavity 22 of the blow molding apparatus 10. In the embodiment shown in FIG. 1, the mandrel 14 is a substantially linear shaft. It is understood that the mandrel 14 may have any shape and configuration adapted to be inserted in the pattern die 12 of the blow molding apparatus 10, as desired.

The extruder 16 shown in FIG. 1 is single screw extruder in communication with the pattern die 12. The extruder 16 includes a hopper 40, a screw 42, a plunger 44, a barrel 46, and an aperture 48. The aperture 48 of the extruder 16 is adapted to receive an end of the mandrel 14. It is understood that the extruder 16 may be any conventional extruder, such as a multiple screw extruder or a ram extruder, for example, as desired. It is also understood that a plurality of extruders may be in communication with the blow molding apparatus 10 to co-extrude a plurality of desired materials.

In use, the first boss 36 and the second boss 37 are heated in an oven (not shown) or other conventional heating device. Next, the first boss 36 is disposed in a portion of the first die half 18 or a portion the second die half 20 that forms the first finish forming die cavity 28. The second boss 37 is positioned in a portion of the first die half 18 or a portion the second die half 20 that forms the second finish forming die cavity 34. The first die half 18 and the second die half 20 are then assembled to close the pattern die 12 of the blow molding apparatus 10 with the bosses 36, 37 disposed in the respective finish forming die cavities 28, 34. If the bosses 36, 37 are heated, is understood that robotic arms (not shown) or other automated devices adapted to withstand elevated heat may be used to position the bosses 36, 37 in the finish forming die cavities 28, 34.

Next, pellets, flakes, or the like 50 of a moldable material are loaded into the hopper 40 of the extruder 16. It is understood that the moldable material may be any conventional moldable material such as a polymer, a metal, a glass, polyethylene, ethylene vinyl alcohol, or an ethylene vinyl acetate terpolymer, for example. The barrel 46 of the extruder 16 is then caused to be heated, while the screw 42 and plunger 44 are engaged by a controller (not shown). As the screw 42 rotates, the pellets 50 in the hopper 40 are fed into the extruder 16 and transported along the length of the screw 42 and heated by the barrel 46 to a temperature at a melting temperature. The melted pellets 50 are then extruded through the aperture 48 and past the end of the mandrel 14. The mandrel 14 causes the material forming the melted pellets 50 to fill a void space between the mandrel 14 and the aperture 48 to form a parison 38. As the melted pellets 50 are continuously extruded from the extruder 16, the mandrel 14 guides the parison 38 through the first boss 36 and the first aperture 19 of the blow molding apparatus 10, into the pattern die 12, and through the second boss 37 and the second aperture 21 of the blow molding apparatus 10. Because the parison 38 is continuously extruded past the mandrel 14, the parison 38 is hollow. It is also understood that a plurality of extruders, similar to the extruder shown in FIG. 1, may be in communication with the blow molding apparatus 10 to co-extrude a plurality of moldable materials to form a multilayered parison, as desired. It is further understood that that plurality of moldable materials may include any combination of layers of polyethylene, ethylene vinyl alcohol, an ethylene vinyl acetate terpolymer, or other conventional polymer, as desired.

Figure 2:
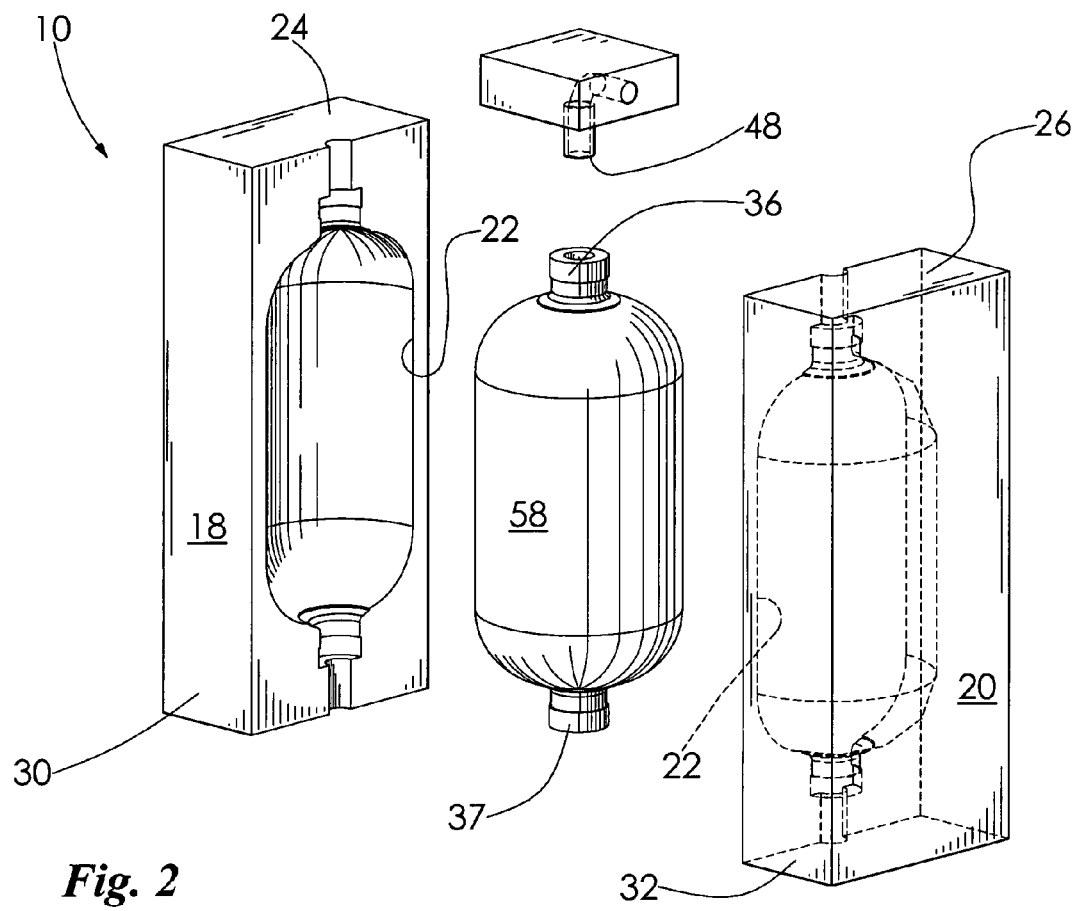
FIG. 2 is an exploded perspective view of the blow molding apparatus shown in FIG. 1 and a blow molded container formed by the apparatus.

With the parison 38 disposed through the bosses 36, 37 and the die cavity 22 of the blow molding apparatus 10, a first fluid (not shown) is caused to flow through the mandrel 14 and into the parison 38 in the die cavity 22. The first fluid causes the parison 38 to expand and contact the walls of the die cavity 22 thereby taking the shape of the die cavity 22. The expansion of the parison 38 is known as a blow molding operation. It is understood that the first fluid may any conventional fluid such as air, nitrogen, hydrogen, or oxygen, as desired. As the parison 38 is expanded by the first fluid, a portion of the parison 38 is caused to contact, adhere to, and form an airtight seal with the heated bosses 36, 37. It is understood that the bosses 36, 37 are heated to facilitate a softening or melting of the portion of the parison 38 caused to contact the bosses 36, 37 to form the airtight seal. It is also understood that the bosses 36, 37 may not be heated, as desired. As shown in FIG. 3, a portion 54 of the material forming the parison 38 is blow molded into a radial inner surface 56 of the bosses 36, 37. Material may be blown into the grooves 52 and on the inner surface 56, and may be cut away or otherwise machined from the bosses 36, 37, as desired. It is understood that the surfaces of the bosses 36, 37 that contact the moldable material during the blow molding process may be etched, coated with a primer, or coated with an adhesive prior to the blow molding process to facilitate adhesion of the bosses 36, 37 to the moldable material, as desired. It is also understood that the bosses 36, 37 may include grooves, cavities, channels, or protuberances adapted to receive a portion of the material to mechanically attach the material to the bosses 36, 37. As illustrated in FIG. 2, once the blow molded material has cooled sufficiently, the first die half 18 and the second die half 20 of the blow molding apparatus 10 are separated and a container 58 having attached bosses 36, 37 adapted to store a second fluid (not shown) is removed. It is understood that the container 58 may be adapted to store any fluid such as a liquid or a gas, as desired.

Once the container 58 is removed from the blow molding apparatus 10, the container 58 may undergo a filament winding process to form a vessel 60 with an outer layer 64 over the container 58 and a portion of the bosses 36, 37, as shown in FIG. 4. FIG. 5 illustrates a vessel 62 having a multilayered extruded container 66 with a filament outer layer 68. It is understood that the material used to form the outer layer 64 may depend on the process used to affix the outer layer, the use of the vessel 60, and the properties of the fluid to be stored in the vessel. The outer layer 68 may be applied to the container 58 by dipping the container 58 in a molten polymer or metal, a coating may be sprayed onto the container 58, or a leather or fabric may be sewn or stitched around the container 58. To be filament wound, the container 58 is disposed over a mandrel (not shown) or disposed in an automated filament winding apparatus (not shown) and rotated as the outer layer 64 is applied. The outer layer 64 is applied such that the filaments (not shown) applied are plied or oriented differently from the previous layer of filament. It is understood that the filament forming the outer layer 64 may be a carbon fiber, a glass fiber, a composite fiber, or a glass fiber having a resin coating, as desired. The filament wound vessel 60 is then placed in an autoclave (not shown) to allow the outer layer 64 and resin to solidify. The filament winding process forms a vessel 60 having increased rigidity and strength, thereby providing a stronger, more durable vessel 60 with an extended useful life. It is understood that the vessel 60 may be a fuel storage adapted for the filling, the removal, and the storage of hydrogen or other fuel, and the vessel 60 may be adapted to withstand a wide range of temperatures and pressures of the fuel.

Figure 6:
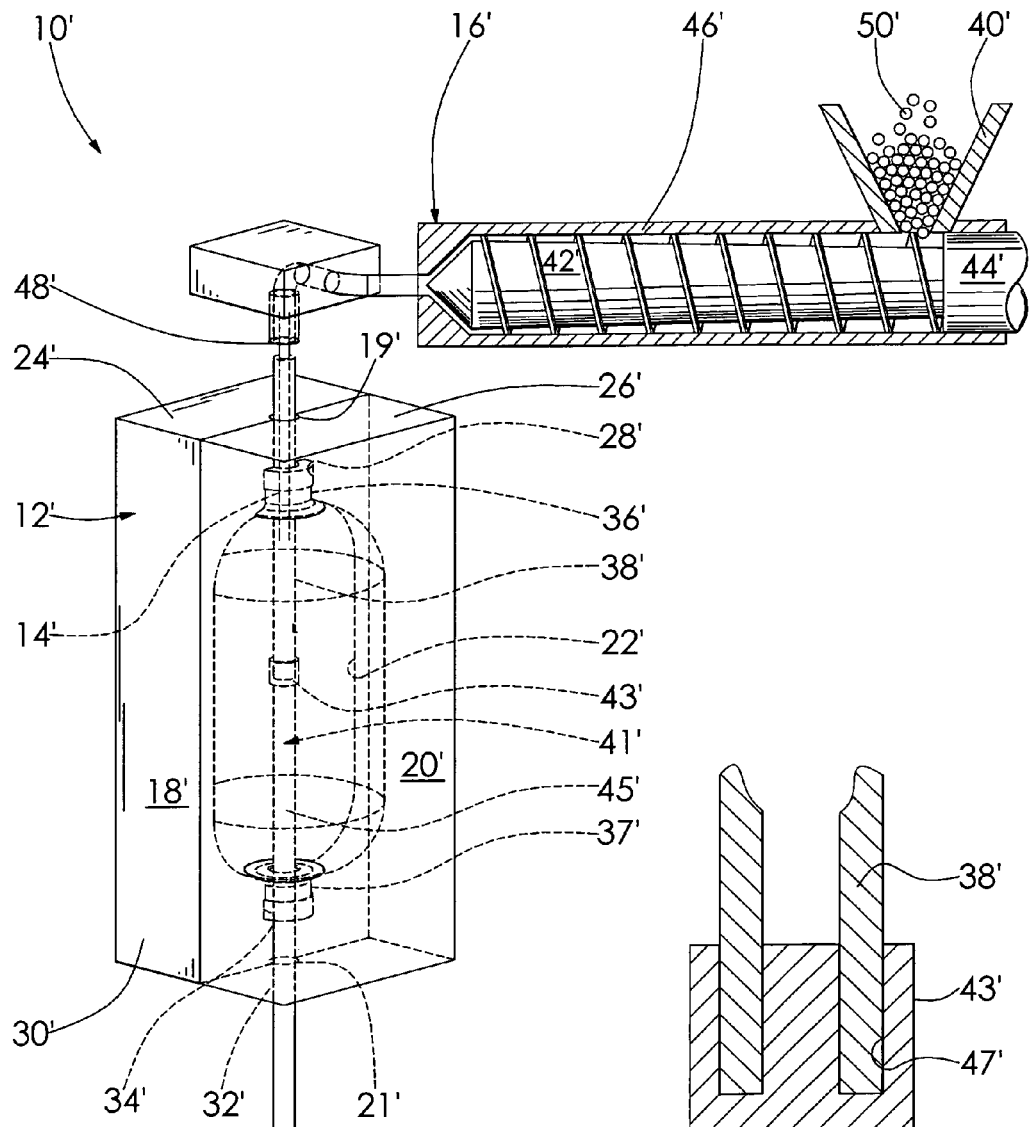
FIG. 6 is a perspective view of an extruder and blow molding apparatus showing a portion in section according to another embodiment of the invention.

FIG. 6 illustrates a blow molding apparatus 10' having a pattern die 12', a mandrel 14', and a support 41', and in communication with an extruder 16' according to another embodiment of the invention. The blow molding apparatus 10' has a substantially rectangular shape, however it is understood that the blow molding apparatus 10' may have any shape as desired. It is also understood that the blow molding apparatus 10' may be formed from any conventional material or combination of materials such as steel, a steel alloy, aluminum, a plastic, a concrete, a wood, or titanium, for example.

The pattern die 12' includes a first die half 18', a second die half 20', a first aperture 19', and a second aperture 21'. The first die half 18' and the second die half 20' cooperate to form a die cavity 22'. In the embodiment shown in FIG. 6, the die cavity 22' has a substantially cylindrical shape with a circular cross-sectional shape. It is understood that the die cavity 22' may form any shape such as rectangular and ovoid, as desired. A first end 24' of the first die half 18' and a first end 26' of the second die half 20' cooperate to form a first finish forming die cavity 28'. The first finish forming die cavity 28' is in communication with the die cavity 22' and is adapted to receive a first boss 36' therein. A second end 30' of the first die half 18' and a second end 32' of the second die half 20' cooperate to form a second finish forming die cavity 34'. The second finish forming die cavity 34' is in communication with the die cavity 22' and is adapted to receive a second boss 37'. It is understood that the first die half 18' and the second die half 20' of the blow molding apparatus 10' may form a single finish forming cavity or a plurality of finish forming cavities, as desired. The bosses 36', 37' are separately produced finishes that form the opening of a container and are shaped to accommodate a specific closure. Similar to the bosses 36, 37 shown in FIGS. 3, 4, and 5, the bosses 36', 37' include a groove (not shown) adapted to receive a portion of a hose, nozzle, conduit, or other means for fluid communication with the bosses 36', 37', and the die cavity 22'. It is also understood that the first boss 36' may be any finish formed from any conventional material such as a plastic, steel, a steel alloy, or aluminum, for example. The first aperture 19' is formed by the first die half 18' and the second die half 20' at the respective first ends 24', 26' thereof. The second aperture 21' is formed by the first die half 18' and the second die half 20' at the respective second ends 30', 32' thereof. The first aperture 19' provides communication between the extruder 16' and the die cavity 22' of the blow molding apparatus 10', and between the mandrel 14' and the die cavity 22' of the blow molding apparatus 10'. In the embodiment shown in FIG. 6, the mandrel 14' is a substantially linear shaft. It is understood that the mandrel 14' may have any shape and configuration adapted to be inserted in the pattern die 12' of the blow molding apparatus 10', as desired.

Figure 7:
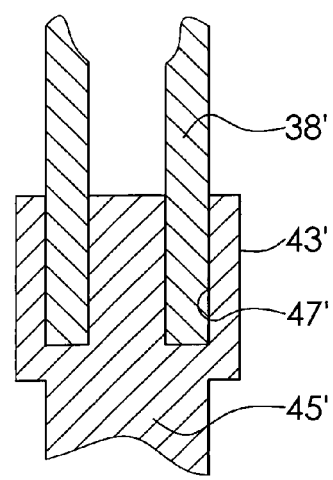
FIG. 7 is a fragmentary sectional view of a stem of a support shown in FIG. 6.

The support 41' includes a base 43' and a stem 45' and is adapted to abut a portion of the parison 38'. The support 41' is positioned through the bosses 36', 37' and is slidably disposed in the die cavity 22'. The support 41' is automated by a controller (not shown). It is understood that the controller may be any conventional motor or a hydraulic piston, as desired. It is also understood that the support 41' may be one of the robotic arms for disposing the bosses 36', 37' in the finish forming die cavities 28', 34'. In the embodiment shown in FIG. 7, the base 43' of the support 41' has a substantially cylindrical shape and includes an annular channel 47' adapted to receive a portion of the parison 38'. The base 43' may have any shape as desired that may be positioned through the bosses 36', 37'. The base 43' may be formed from any conventional material such as a steel, a steel alloy, aluminum, titanium, concrete, or a plastic, as desired. It is also understood that the base 43' may be the second boss 37' detachably fixed to the stem 45' and disposed adjacent the first boss 36' in the die cavity 22' prior to the extrusion. As the parison 38' is extruded, the second boss 37' and stem 45' provide support to the parison 38' until the second boss 37' is disposed in the second finish forming cavity 34', the stem 45' is removed, and the parison 38' is extruded through the second boss 37'. In the embodiment shown in FIGS. 6 and 7, the stem 45' is a shaft, however, it is understood that the stem 45' may be a screw (not shown), a piston (not shown), or other structure adapted to slidably position the support 41' and base 43'.

The extruder 16' shown in FIG. 6 is single screw extruder in communication with the pattern die 12'. The extruder 16' includes a hopper 40', a screw 42', a plunger 44', a barrel 46', and an aperture 48'. The aperture 48' of the extruder 16' is adapted to receive an end of the mandrel 14'. It is understood that the extruder 16' may be any conventional extruder, such as a multiple screw extruder or a ram extruder, for example, as desired. It is also understood that a plurality of extruders may be in communication with the blow molding apparatus 10' to co-extrude a plurality of desired materials.

In use, the first boss 36' and the second boss 37' are heated in an oven (not shown) or other conventional heating device. Next, the first boss 36' is disposed in a portion of the first die half 18' or a portion the second die half 20' that forms the first finish forming die cavity 28'. The second boss 37' is positioned in a portion of the first die half 18' or a portion the second die half 20' that forms the second finish forming die cavity 34'. The first die half 18' and the second die half 20' are then assembled to close the pattern die 12' of the blow molding apparatus 10' with the bosses 36', 37' disposed in the respective finish forming die cavities 28', 34'. If the bosses 36', 37' are heated, is understood that robotic arms (not shown) or other automated devices adapted to withstand elevated heat may be used to position the bosses 36', 37' in the finish forming die cavities 28', 34'.

Next, pellets, flakes, or the like 50' of a moldable material are loaded into the hopper 40' of the extruder 16'. It is understood that the moldable material may be any conventional moldable material such as a metal, a glass, polyethylene, ethylene vinyl alcohol, or an ethylene vinyl acetate terpolymer, for example. The barrel 46' of the extruder 16' is then caused to be heated, while the screw 42' and plunger 44' are engaged by a controller (not shown). As the screw 42' rotates, the pellets 50' in the hopper 40' are fed into the extruder 16' and transported along the length of the screw 42' and heated by the barrel 46' to a temperature at a melting temperature. The melted pellets 50' are then extruded through the aperture 48' and past the end of the mandrel 14'. The mandrel 14' causes the material forming the melted pellets 50' to fill a void space between the mandrel 14' and the aperture 48' to form a parison 38'. As the melted pellets 50' are continuously extruded from the extruder 16', the mandrel 14' guides the parison 38' through the first boss 36' and the first aperture 19' of the blow molding apparatus 10', into the pattern die 12', and through the second boss 37' and the second aperture 21' of the blow molding apparatus 10'. Because the parison 38' is continuously extruded past the mandrel 14', the parison 38' is hollow. It is also understood that a plurality of extruders, similar to the extruder shown in FIG. 6, may be in communication with the blow molding apparatus 10' to co-extrude a plurality of moldable materials to form a multilayered parison, as desired. It is further understood that that plurality of moldable materials may include any combination of layers of polyethylene, ethylene vinyl alcohol, an ethylene vinyl acetate terpolymer, or other conventional polymer, as desired.

The overall size and weight of the parison 38' increases as it is extruded. The weight of the parison 38' will vary based on the wall thickness of the parison 38', the material used to form the parison 38', the dimensions of a desired blow molded object, and other similar considerations. As the parison 38' is extruded and lengthens, gravity and the weight of the parison 38' may stretch and thin a wall of the parison 38' at a top 39' of the parison 38' adjacent the aperture 48' of the extruder 16'. As shown in FIG. 6, the parison 38' abuts the support 41' to support the weight of the parison 38' as it is extruded. The support 41' is positioned through the bosses 36', 37' and is slidably disposed in the die cavity 22'. To minimize the stretching of the parison 38' caused by gravity and the weight of the parison 38', the support 41' is slidably removed from the die cavity 22' at the same rate as the extrusion of the parison 38' until the parison 38' is disposed through the second boss 37'.

With the parison 38' disposed through the bosses 36', 37' and the die cavity 22' of the blow molding apparatus 10', a first fluid (not shown) is caused to flow through the mandrel 14' and into the parison 38' in the die cavity 22'. The first fluid causes the parison 38' to expand and contact the walls of the die cavity 22' thereby taking the shape of the die cavity 22'. The expansion of the parison 38' is known as a blow molding operation. It is understood that the first fluid may any conventional fluid such as air, nitrogen, hydrogen, or oxygen, as desired. As the parison 38' is expanded by the first fluid, a portion of the parison 38' is caused to contact, adhere to, and form an airtight seal with the heated bosses 36', 37'. It is understood that the bosses 36', 37' are heated to facilitate a softening or melting of the portion of the parison 38' caused to contact the bosses 36', 37' to form the airtight seal. It is also understood that the bosses 36', 37' may not be heated, as desired. A portion of the material forming the parison 38' is blow molded into a radial inner surface (not shown) of the bosses 36', 37', similar to the bosses 36, 37 and embodiment shown in FIG. 3. Material may be blown into the grooves and on the inner surface, and may be cut away or otherwise machined from the bosses 36', 37', as desired. It is understood that the surfaces of the bosses 36', 37' that contact the moldable material during the blow molding process may be etched, coated with a primer, or coated with an adhesive prior to the blow molding process to facilitate adhesion of the bosses 36', 37' to the moldable material, as desired. It is also understood that the bosses 36', 37' may include grooves, cavities, channels, or protuberances adapted to receive a portion of the material to mechanically attach the material to the bosses 36', 37'. Similar to the embodiment illustrated in FIG. 2, once the blow molded material has cooled sufficiently, the first die half 18' and the second die half 20' of the blow molding apparatus 10' are separated and a container (not shown) having attached bosses 36', 37' adapted to store a second fluid (not shown) is removed. It is understood that the container may be adapted to store any fluid such as a liquid or a gas, as desired.

Once the container is removed from the blow molding apparatus 10', the container may undergo a filament winding process to form a vessel (not shown) with an outer layer (not shown) over the container and a portion of the bosses 36', 37', similar to the vessel 60 shown in FIG. 4. It is understood that the material used to form the outer layer may depend on the process used to affix the outer layer, the use of the vessel, and the properties of the fluid to be stored in the vessel. The outer layer may be applied to the container by dipping the container in a molten polymer or metal, a coating may be sprayed onto the container, or a leather or fabric may be sewn or stitched around the container. To be filament wound, the container is disposed over a mandrel (not shown) or disposed in an automated filament winding apparatus (not shown) and rotated as the outer layer is applied. The outer layer is applied such that the filaments (not shown) applied are plied or oriented differently from the previous layer of filament. It is understood that the filament forming the outer layer may be a carbon fiber, a glass fiber, a composite fiber, or a glass fiber having a resin coating, as desired. The filament wound vessel is then placed in an autoclave (not shown) to allow the outer layer and resin to solidify. The filament winding process forms a vessel having increased rigidity and strength, thereby providing a stronger, more durable vessel with an extended useful life. It is understood that the vessel may be a fuel storage adapted for the filling, the removal, and the storage of hydrogen or other fuel, and the vessel may be adapted to withstand a wide range of temperatures and pressures of the fuel.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:
1. A method of forming a fluid vessel comprising the steps of;
   providing a pattern die having a first finish forming cavity and a die cavity formed therein;
   providing a mandrel disposed in the pattern die and adapted to receive an extruded parison formed from a moldable material;

providing a boss, wherein the boss is disposed in the first finish forming cavity prior to forming a container in the pattern die;

providing a support slidably disposed in the pattern die and adapted to support the weight of the parison as it is extruded through said pattern die;

positioning the mandrel and parison in the die cavity, wherein the parison is extruded onto the support;

slidably removing the support from the die cavity at the same rate of extrusion of the parison until the parison is disposed through the die cavity;

causing a fluid to flow through the parison and pattern die to expand the parison to form the container having the shape of the die cavity of the pattern die and to form an airtight seal between the container and the boss;

removing the container from the pattern die; and providing an outer layer on an outer surface of the container.

2. The method of claim 1, further comprising the step of filament winding the container to provide the outer layer.

3. The method of claim 1, further comprising the step of providing a second finish forming cavity in the pattern die.

4. The method of claim 3, further including the step of providing a plurality of bosses, wherein a first boss is disposed in the first finish forming cavity prior to forming a container in the pattern die and a second boss is disposed in the second finish forming cavity prior to forming a container in the pattern die.

5. The method of claim 1, wherein the moldable material is a polymer.

6. The method of claim 1, wherein the moldable material is one of polyethylene, ethylene vinyl alcohol, and an ethylene vinyl acetate terpolymer.

7. The method of claim 1, wherein the moldable material has multiple polymer layers.

8. The method of claim 1, further comprising the step of heating the boss before the boss is disposed in the first finish forming cavity.

9. The method of claim 1, wherein said outer layer is formed from one of a carbon fiber, a carbon fiber composite, a glass fiber, and a glass fiber having a resin coating.

10. A method of forming a fluid vessel comprising the steps of:

providing a pattern die having a first finish forming cavity, a second finish forming cavity and a die cavity formed therein;

disposing a first boss in the first finish forming cavity prior to forming a container in the pattern die;

disposing a mandrel in the pattern die, the mandrel adapted to receive an extruded parison formed from a moldable material;

disposing a slidable support in the pattern die through the second finish forming cavity, the slidable support adapted to support the weight of the parison as the parison is extruded through the pattern die;

extruding the parison past an end of the mandrel and onto the support, the parison abutting the support;

sliding the slidable support at substantially a same rate as the extrusion of the parison, wherein a stretching of the parison caused by gravity is minimized;

removing the slidable support from the die cavity when the extruded parison is disposed through the second finish forming cavity:

causing a fluid to flow through the parison to expand the parison and to form the container having a shape of the die cavity of the pattern die and to form an airtight seal between the container and the boss;

removing the container from the pattern die; and disposing an outer layer on an outer surface of the container.

11. The method of claim 10, further including the step of disposing a second boss in the second finish forming cavity prior to forming a container in the pattern die.

12. The method of claim 11, wherein the support includes a stem and a base, the stem disposed through the second boss disposed in the second finish forming cavity, and the base having an annular channel that receives the parison.

13. The method of claim 10, wherein the slidable support is formed from a stem and a base adapted to receive the extruded parison.

14. The method of claim 13, wherein the stem includes an annular channel adapted to receive a portion of the extruded parison.

15. The method of claim 13, wherein the base is detachably fixed to the stem.

16. The method of claim 15, wherein the base is a second boss to be received in the second finish forming cavity.

17. The method of claim 16, wherein an airtight seal is formed between the container and the second boss during the causing a fluid to flow through the parison step.

* * * * *